US012306604B2

(12) United States Patent
Gerwig et al.

(10) Patent No.: US 12,306,604 B2
(45) Date of Patent: May 20, 2025

(54) AUTOMATION FIELD DEVICE

(71) Applicant: Endress+Hauser SE+Co. KG, Maulburg (DE)

(72) Inventors: Simon Gerwig, Schopfheim (DE); Christian Strittmatter, Rickenbach (DE); Roberto Lugli, Segrate (IT)

(73) Assignee: Endress+Hauser SE+Co. KG, Maulburg (DE)

( * ) Notice: Subject to any disclaimer, the term of this patent is extended or adjusted under 35 U.S.C. 154(b) by 826 days.

(21) Appl. No.: 17/618,744

(22) PCT Filed: May 6, 2020

(86) PCT No.: PCT/EP2020/062529
§ 371 (c)(1),
(2) Date: Dec. 13, 2021

(87) PCT Pub. No.: WO2020/249322
PCT Pub. Date: Dec. 17, 2020

(65) Prior Publication Data
US 2022/0260960 A1 Aug. 18, 2022

(30) Foreign Application Priority Data

Jun. 14, 2019 (DE) .................. 10 2019 116 193.2

(51) Int. Cl.
*G05B 19/042* (2006.01)
(52) U.S. Cl.
CPC ....... *G05B 19/0423* (2013.01); *G05B 19/042* (2013.01); *G05B 2219/25008* (2013.01); *G05B 2219/25428* (2013.01)

(58) Field of Classification Search
CPC .............. G05B 19/0423; G05B 19/042; G05B 2219/25428; G05B 2219/25008
See application file for complete search history.

(56) References Cited

U.S. PATENT DOCUMENTS

2004/0199681 A1  10/2004 Hedtke
2007/0243830 A1* 10/2007 Isenmann ............ H04B 17/309
                                                                    455/67.11
(Continued)

FOREIGN PATENT DOCUMENTS

CN       101634833 A       1/2010
CN       102112932 A       6/2011
(Continued)

*Primary Examiner* — Glenn A. Auve
(74) *Attorney, Agent, or Firm* — Mark A. Logan; Endress+Hauser (USA) Holding, Inc.

(57) ABSTRACT

An automation field device comprises at least four connection pins for connecting the field device; a field device electronics adapted, in a first operating state, to provide a 4-20 mA signal via a first and second connection pin, in a second operating state, to be supplied with a supply voltage via the first and a third connection pin and via a fourth connection pin to enable an IO-Link communication or to provide a first switch output and supplementally to provide a second switch output on the second connection pin, and, in a third operating state, to be supplied with the supply voltage via the first and third connection pins and via the fourth connection pin to enable the IO-Link communication or to provide the first switch output and supplementally to provide a 4-20 mA current output on the second connection pin.

7 Claims, 3 Drawing Sheets

(56) References Cited

U.S. PATENT DOCUMENTS

| | | | |
|---|---|---|---|
| 2015/0143009 A1 | 5/2015 | Feinaeugle et al. | |
| 2019/0074993 A1* | 3/2019 | Feinaeugle | G06F 13/122 |
| 2020/0183347 A1* | 6/2020 | Dijkhoff | G05B 19/4185 |
| 2021/0149358 A1* | 5/2021 | Wagner | G05B 19/0426 |

FOREIGN PATENT DOCUMENTS

| | | |
|---|---|---|
| CN | 107643737 A | 1/2018 |
| CN | 107925440 A | 4/2018 |
| DE | 102006017243 A1 | 10/2007 |
| DE | 102012021847 A1 | 5/2014 |
| DE | 102015221512 A1 | 5/2017 |
| WO | 2015161915 A1 | 10/2015 |

* cited by examiner

AUTOMATION FIELD DEVICE

CROSS-REFERENCE TO RELATED APPLICATIONS

The present application is related to and claims the priority benefit of German Patent Application No. 10 2019 116 193.2, filed on Jun. 14, 2019 and International Patent Application No. PCT/EP2020/062529, filed on May 6, 2020, the entire contents of which are incorporated herein by reference.

TECHNICAL FIELD

The invention relates to an automation field device.

BACKGROUND

In automation technology, especially in process automation technology, field devices are often applied, which serve for registering and/or influencing process variables. Serving for registering process variables are sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH value, and conductivity. Serving for influencing process variables are actuators, such as, for example, valves or pumps, via which the flow of a liquid in a pipeline section, or the fill level in a container, can be changed. Referred to as field devices are, in principle, all devices, which are applied near to a process and which deliver, or process, process relevant information. In connection with the invention, the terminology, field devices, thus, refers especially also to remote I/Os, radio adapters, and, in general, devices, which are arranged at the field level.

A large number of such field devices are produced and sold by the firm, Endress+Hauser.

Such are, for reasons of history, usually connected via a two-conductor line, i.e. a line with two separately formed leads, to a superordinated unit, for example, a controller (PLC), or control system. The two conductor field devices are embodied, in such case, in such a manner that the measured-, or actuating, values are communicated, i.e. transmitted, as process variable via the two-conductor line, or two conductor cable, in analog form as a 4-20 mA loop current, thus an electrical current signal. In such case, a loop current of the two-conductor line is set by the field device and the superordinated unit at a specific value corresponding to the registered process variable.

Furthermore, the field device can also be supplied with energy via the two-conductor line. In such case, however, only a very limited amount of energy can be made available to the field device. Alternatively, in the case, in which more energy is required than can be provided to a field device via the two-conductor line, the field devices can also be connected via a three- or four-wire line. Such can, for example, be necessary, when measurements must be made more often. In the case of use of a three- or four-wire line, the energy is transmitted on a separate line-pair and the measured-, or actuating, value is transmitted on a third line in the form of a 4-20 mA signal.

Besides the "classic" connecting of field devices via a two-conductor line, in the case of which the measured-, or actuating, values are transmitted via a 4-20 mA signal, increasingly newer transmission/communication devices are being used. One of these systems is IO-Link. IO-Link is a communication apparatus for connecting intelligent sensors and actuators based on the standard, IEC 61131-9, of September 2013, entitled "Single-drop digital communication interface for small sensors and actuators" (SDCI).

Usually, a field device manufacturer produces a field device for 4-20 mA signal or IO-Link operation. I.e., the field device electronics located in a field device unit is given hardware either for 4-20 mA operation or IO-Link operation. Additionally, the field device electronics hardware enables either two-, three- or four-wire operation. This means that a special field device electronics must be made for virtually each operating state or combination of operating features.

SUMMARY

It is, thus, an object of the invention to provide a field device having a field device electronics built on a "one design fits all" concept, which thus can be flexibly set to the desired operating state.

The object is achieved according to the invention by an automation field device as defined in claim 1.

The automation field device of the invention comprises:
at least four connection pins for connecting the field device;
a field device electronics, which is adapted, in a first operating state, to provide a 4-20 mA signal via a first and a second connection pin, in a second operating state, to be supplied with a supply voltage via the first and a third connection pin and via a fourth connection pin to enable an IO-Link communication or to provide a first switch output and supplementally to provide a second switch output on the second connection pin, and, in a third operating state, to be supplied with the supply voltage via the first and third connection pins and via the fourth connection pin to enable the IO-Link communication or to provide the first switch output and supplementally to provide a 4-20 mA current output on the second connection pin, wherein the field device electronics is adapted, furthermore, to be so configured that such can be operated selectively in one of the three operating states.

An advantageous embodiment of the field device of the invention provides that the field device electronics is adapted, furthermore, automatically to detect, whether the IO-Link communication occurs, or should occur, via the fourth connection pin or whether the fourth connection pin is used as the first switch output. Especially, the embodiment can provide that the automatic detecting occurs as a function of a device, which is connected to the fourth connection pin.

Another advantageous embodiment of the field device of the invention provides that, in the first operating state, in which the 4-20 mA signal is provided via the first and second connection pins, the third and fourth connection pins are deactivated.

Another advantageous embodiment of the field device of the invention provides that the field device electronics is adapted via the fourth connection pin, via which the IO-Link communication is implemented, to be configured corresponding to one of the three operating states. Especially, the embodiment can provide that the configuration occurs before a start-up of the field device in an automated plant, especially in, or during, an assembly of the field device.

Another advantageous embodiment of the field device of the invention provides that, for operation of the field device electronics in the third operating state, an external load resistance is connected between the second connection pin and the third connection pin.

BRIEF DESCRIPTION OF THE DRAWINGS

The invention will now be explained in greater detail based on the appended drawing, the figures of which show as follows.

DETAILED DESCRIPTION

Figure 1:
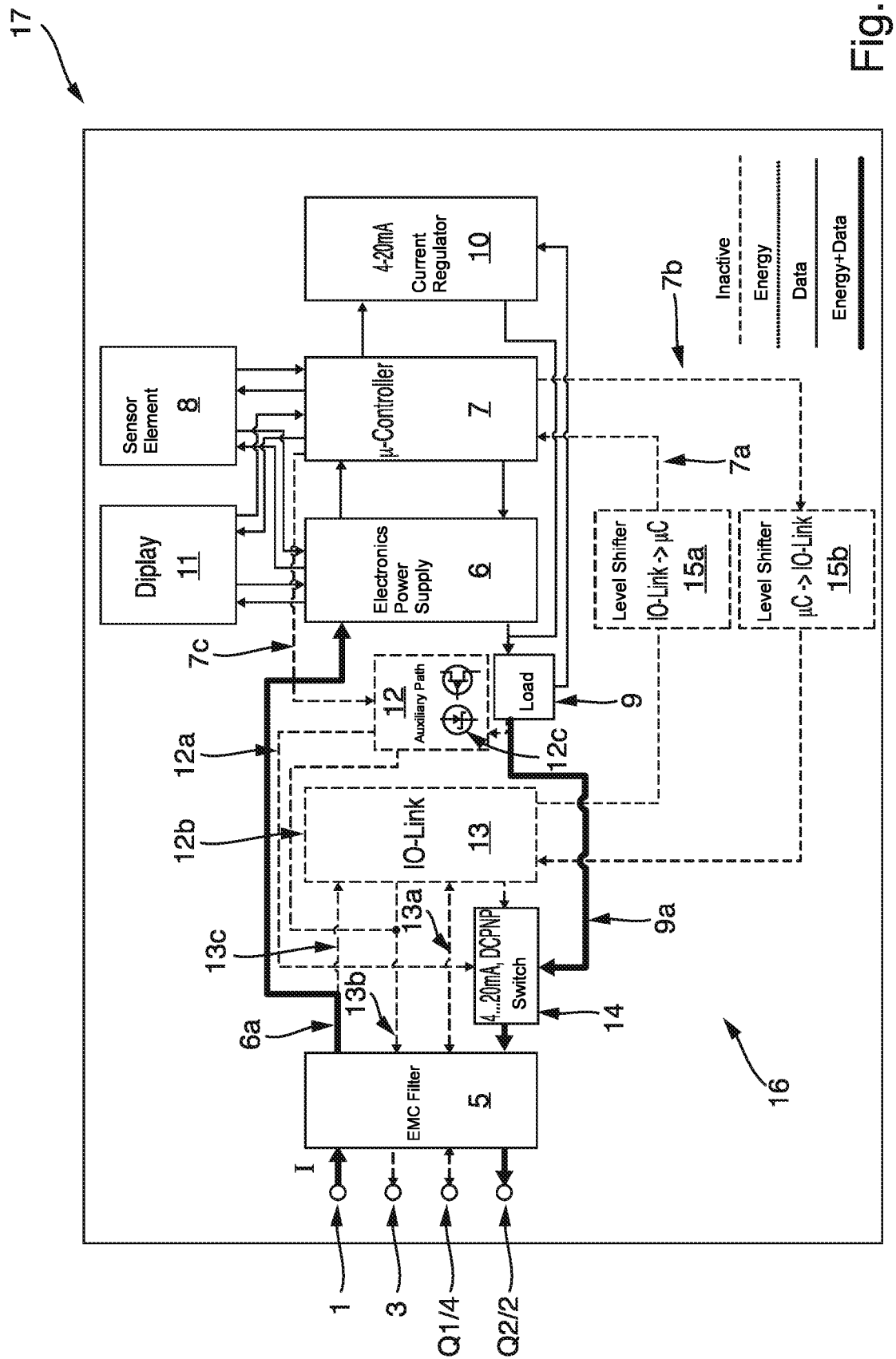
FIG. 1 shows a block diagram of a field device of the invention having a field device electronics adapted to be operated in a first operating state.
Figure 2:
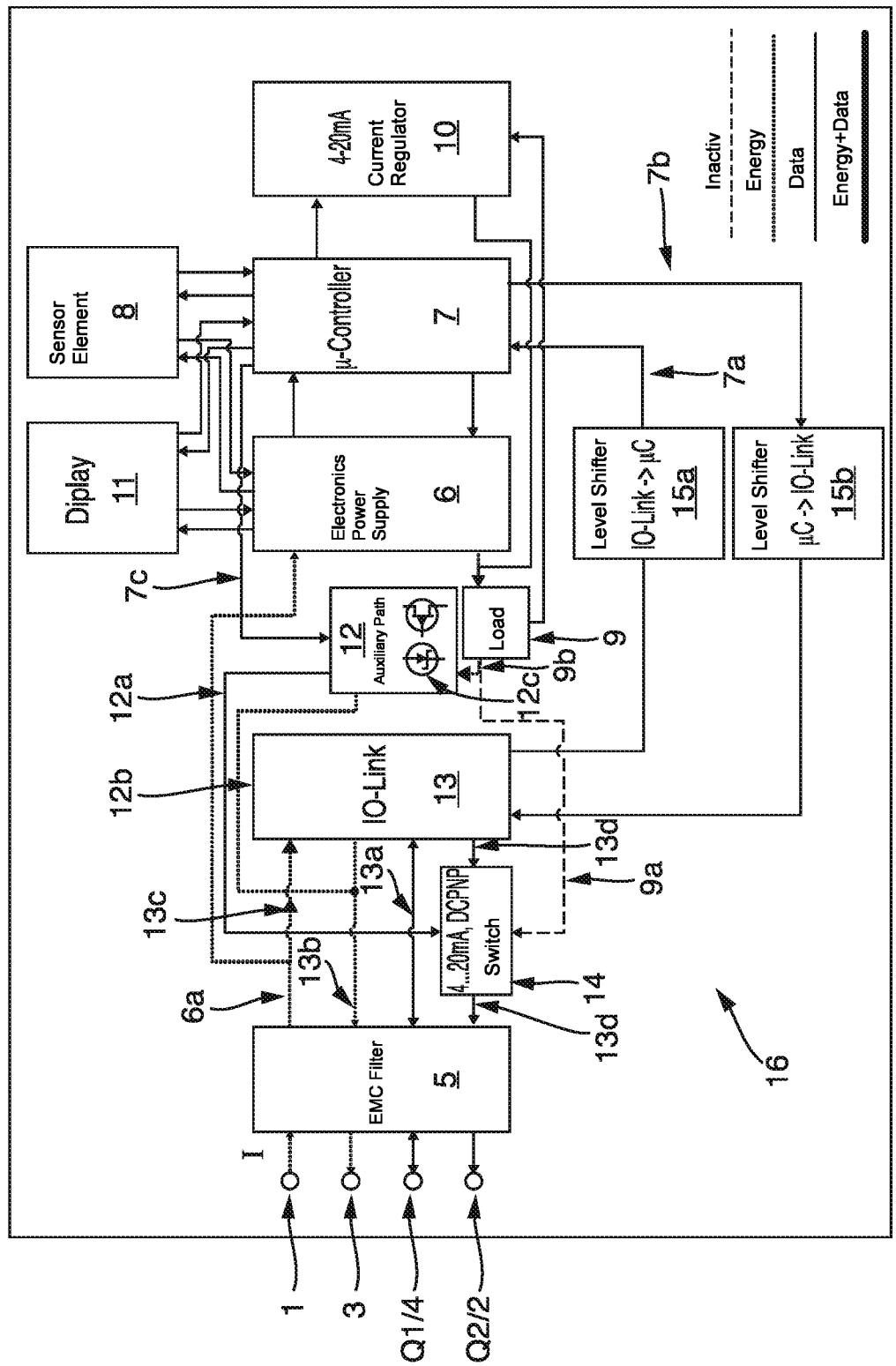
FIG. 2 shows a block diagram of the field device of the invention having the field device electronics adapted to be operated in a second operating state.
Figure 3:
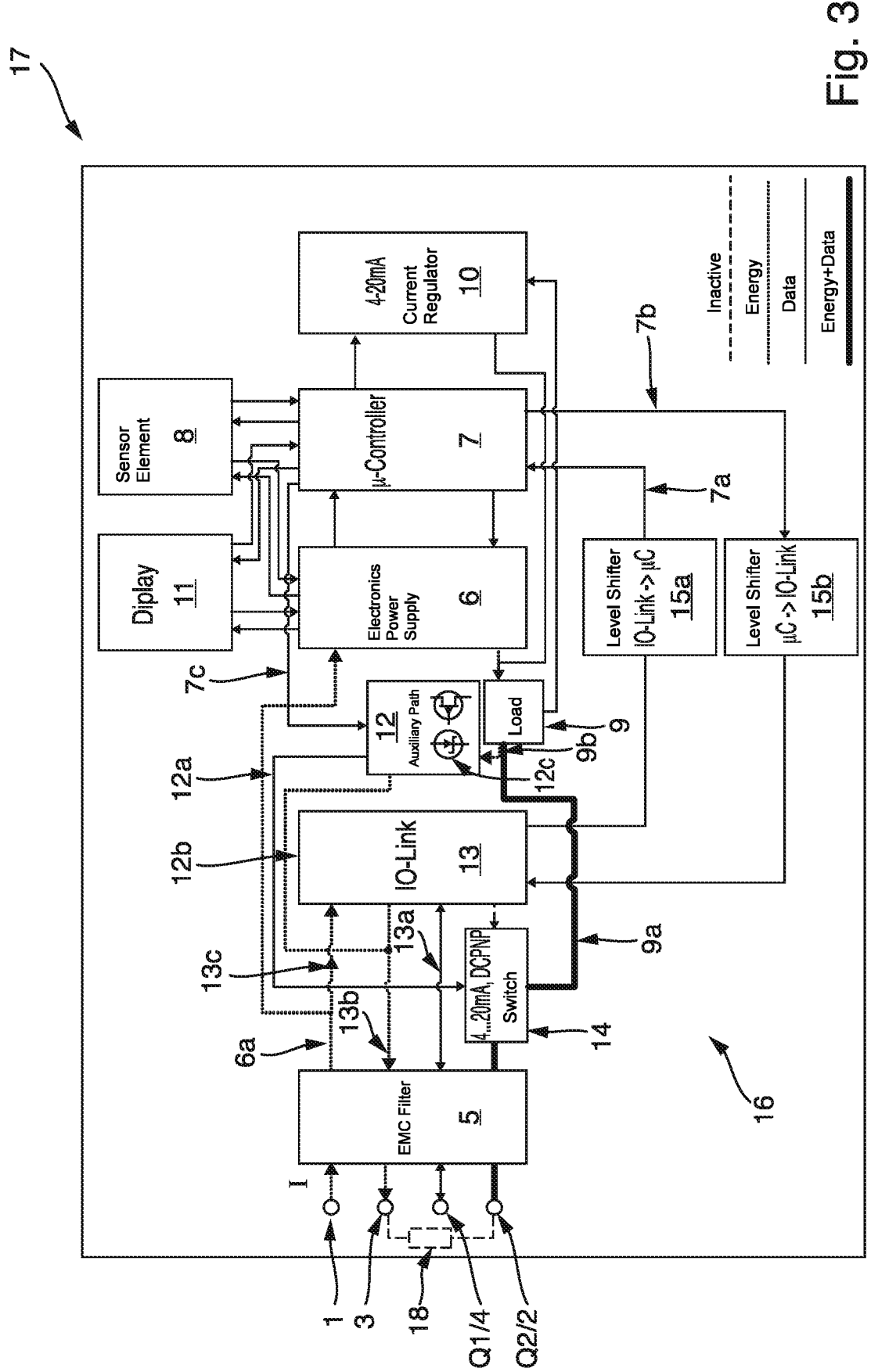
FIG. 3 shows a block diagram of the field device of the invention having the field device electronics adapted to be operated in a third operating state.

FIGS. 1 to 3 all show a field device 17 having, as regards hardware, a uniformly, equally formed field device electronics 16. The uniformly embodied field device electronics includes, in each case, four connection pins 1, 2, 3, 4, via which the field device 17 can be connected in an automated plant, an EMC filter 5, which follows the connection pins 1, 2, 3, 4 for protecting the field device 17 against possible EMC disturbances, an electronics power supply unit 6 for internal energy supply, a microprocessor 7 for internal control of the field device electronics 16, a sensor- or actuator element 8 for registering or setting a measurement-, or actuating, value, as the case may be, a load resistance 9 and a 4-20 mA electrical current regulator 10, which together with the load resistance 9 sets an electrical current value I. Additionally, the field device electronics 16 includes for enabling an IO-Link operation an auxiliary circuit 12 for forming first and second auxiliary paths 12a, 12b and an IO link unit 13 for enabling an IO-Link communication. In such case, the IO link unit 13 is connected with a first output path 13a with the fourth connection pin 4 via the EMC filter, such that a bidirectional IO-Link communication can occur via the fourth connection pin 4. Furthermore, the IO-link unit 13 is connected with a supply path 13b via the EMC filter 5 with the third connection pin 3 and with a supply path 13c via the EMC filter with the first connection pin 1. The IO link unit 13 is supplementally connected via a switching unit 14 and the EMC filter 5 with the second connection pin 2. The switching unit 14 is embodied in such a manner that the second connection pin 2 can be operated either as a second switch output Q2 or as an (active or, in two conductor operation, passive) current output, on which a 4-20 mA signal is output. The configuration of the switching unit 14 can occur, for example, by means of the microprocessor. This can, for example, via a control signal, operate the auxiliary circuit, which forwards the control signal to the switching unit.

Supplementally or alternatively, the configuration can occur via an IO-Link communication, for example, by means of an IO-Link master connected to the fourth connection pin 4. Such can occur, for example, at, or during, the assembly of the field device 17 by the field device manufacturer.

In order to enable control of the IO link unit 13 and the auxiliary circuit 12, the microprocessor is connected via first and second control lines 7a and 7b with the IO link unit 13 and via a third control line 7c with the auxiliary circuit 12.

In order to be able to reconcile possible voltage level differences between microprocessor 7 and IO link unit 13, a first level converter 15a can be introduced into the first control line 7a and a second level converter 15b into the second control line 7b.

Furthermore, the field device electronics can include a display- and/or input unit 11, for example, in the form of a touch display. Via the display- and/or input unit 11, for example, measured-, or actuating, values can be displayed or a parametering of the field device 17 can be performed.

Because of the uniformly embodied field device electronics 16, such can according to the invention be operated in different operating states. The different operating states are shown in FIGS. 1 to 3, wherein for clarification, in each case, the inactive electrical connections are shown dashed, the electrical connections serving for data transmission are shown with a thin line, the electrical connections serving for energy transmission are shown with a medium line, and the electrical connections serving for energy- and data transmission are shown with a thick line.

First, the field device electronics 16 can, such as shown in FIG. 1, be operated in a first operating state, which is a purely 4-20 mA two wire operation. In such case, a two-conductor line is connected to the first and second connection pins 1 and 2, in order to apply a voltage to the field device electronics 16. An electrical current I is fed to the electronics power supply unit 6 via the EMC filter 5 on a first data- and/or energy supply path, or 4-20 mA path, 6a, which in the first operating state represents a 4-20 mA input path (brought out in FIG. 1 by a thick line). In the first operating state, the supplied electrical current I, on the one hand, feeds the electronics power supply unit 6, in order that it can provide the internal operating voltage, and, on the other hand, the electrical current I provides a signal in the form of a 4-20 mA signal, via which a measurement-, or actuating, value can be transmitted. For example, when the field device is embodied as a sensor, i.e. has a sensor element, the electrical current can be set via the 4-20 mA current regulator 10 together with the load resistance 9 corresponding to a process variable registered by the sensor element, in order then to be transmitted to a superordinated unit (not shown in FIG. 1). In order to enable the pure 4-20 mA two wire operation, the switching unit 14 is configured in such a manner that the electrical current I coming from the load resistance 9 is led via a 4-20 mA output path 9a to the second connection pin 2.

Furthermore, the field device electronics 16 can, such as shown in FIG. 2, be operated in a second operating state. In the second operating state, the field device electronics 16 is supplied with a supply voltage via the first and the third connection pins 1, 3. In such case, the IO link unit 13 and the electronics power supply unit 6 are supplied with energy via the first data- and/or energy supply path, or 4-20 mA path, 6a, which in the second operating state represents a pure energy supply path (in FIG. 2 indicated by a line with medium thickness).

Furthermore, in the second operating state, via a fourth connection pin 4, an IO-Link communication is enabled, or alternatively a first switch output Q1 is provided. Additionally in the second operating state, a second switch output Q2 is provided on the second connection pin 2. For this, the switching unit 14 switches between the 4-20 mA output path and a third output path 13d. In the second operating state, the field device electronics 16 is supplied via an internal supply auxiliary path, which can be led through a reference diode 12c. For this, however, an approximately 10 V higher supply voltage is necessary. The reference diode 12c can be part of the auxiliary circuit 12. The supply auxiliary path comprises the third control line 7c, the second auxiliary path 12b and an eighth auxiliary path 9b.

The field device electronics 16 can, furthermore, be adapted to detect automatically, whether via the fourth connection pin 4 an IO-Link communication to an external IO-Link master should occur, or whether the fourth connection pin should be used as first switch output Q1. For the automatic detecting, the field device electronics 16 can, for example, be adapted to monitor the fourth connection pin 4 as to whether this is drawn quickly by the external IO-Link master to an inverting switch state.

Furthermore, the field device electronics 16 can, such as shown in FIG. 3, be operated in a third operating state. In the third operating state, the field device electronics 16 is again supplied with the supply voltage via the first and third connection pins 1, 3. Likewise in the third operating state, via the fourth connection pin 4, the IO-Link communication is enabled or the first switch output Q1 provided. Additionally, a 4-20 mA current output is provided on the second connection pin 2. In the third operating state, an external (outside of the field device) load resistance 18 can be connected between the connection pin 3 and the connection pin 2. In such case, the field device electronics is supplied with energy via the 4-20 mA electrical current I, which is fed on the first connection pin 1.

If no external load resistance 18 is connected between the connection pins 2 and 3, the field device electronics 16 is supplied in the third operating state with energy via the internal supply auxiliary path, exactly as in the second operating state.

LIST OF REFERENCE CHARACTERS

1 first connection pin
2 second connection pin
3 third connection pin
4 fourth connection pin
5 EMC filter
6 electronics power supply unit
6a first data- and/or energy supply path/4-20 mA path
7 microprocessor
7a first control line
7b second control line
7c third control line
8 sensor- or actuator element
9 load resistance
9a 4-20 mA output path
9b eighth auxiliary path
10 4-20 mA current regulator
11 display- and/or output unit
12 auxiliary circuit
12a first auxiliary path
12b second auxiliary path
12c reference diode
13 IO link unit
13a first output path to connection pin 4
13b second output path to connection pin 3
13c supply path
13d third output path to connection pin 2
14 switching unit
15a first level converter between IO link unit and microprocessor
15b second level converter between microprocessor and IO link unit
16 field device electronics
17 field device
18 external load resistance
I electrical current
Q1 first switch output
Q2 second switch output

The invention claimed is:

1. An automation field device, comprising:
at least four connection pins for connecting the field device; and
a field device electronics adapted, in a first operating state, to provide a 4-20 mA signal via a first and a second connection pin, in a second operating state, to be supplied with a supply voltage via the first and a third connection pin and via a fourth connection pin to enable an IO-Link communication or to provide a first switch output and supplementally to provide a second switch output on the second connection pin, and, in a third operating state, to be supplied with the supply voltage via the first and third connection pins and via the fourth connection pin to enable the IO-Link communication or to provide the first switch output and supplementally to provide a 4-20 mA current output on the second connection pin,
wherein the field device electronics is configured to be operated selectively in one of the three operating states.

2. The automation field device as claimed in claim 1, wherein the field device electronics is further configured to detect automatically whether the IO-Link communication occurs, or should occur, via the fourth connection pin or whether the fourth connection pin is used as the first switch output.

3. The automation field device as claimed in claim 2, wherein the automatic detecting occurs as a function of a device that is connected to the fourth connection pin.

4. The automation field device as claimed in claim 1, wherein in the first operating state in which the 4-20 mA signal is provided via the first and second connection pins, the third and fourth connection pins are deactivated.

5. The automation field device as claimed in claim 1, wherein the field device electronics is further configured via the fourth connection pin, via which the IO-Link communication is implemented, to be configured corresponding to one of the three operating states.

6. The automation field device as claimed in claim 5, wherein the configuration occurs before a start-up of the field device in an automated plant, in, or during, an assembly of the field device.

7. The automation field device as claimed in claim 1, wherein for operation of the field device electronics in the third operating state, an external load resistance is connected between the second connection pin and the third connection pin.

* * * * *